United States Patent Office 3,455,833
Patented July 15, 1969

3,455,833
CO-OXYGEN CONDENSED PETROLEUM HYDROCARBON AND REACTIVE MONOMER COMPOSITIONS
Franklin I. L. Lawrence, Bradford, and Michael J. Pohorilla, Berwyn, Pa., assignors to Kendall Refining Company, a division of Witco Chemical Company, a corporation of Delaware
No Drawing. Continuation-in-part of application Ser. No. 221,883, Sept. 6, 1962. This application Dec. 27, 1966, Ser. No. 604,542
Int. Cl. C10m 1/14, 1/20, 3/08
U.S. Cl. 252—55     5 Claims

ABSTRACT OF THE DISCLOSURE

A composition of matter having V.I. improver characteristic produced by co-oxygen condensing a liquid petroleum fraction having a molecular weight in excess of about 750, less than 50% aromatic carbon atom and a bromine member less than 10 and about 1% to 25% of a reactive monomer from the group consisting of unsaturated fats and oils and esters of unsaturated fatty acids with oxygen at a temperature in excess of about 350° F. but below the temperature of decomposition.

---

This invention relates to novel compositions of matter useful as viscosity index improving agents for lubricants and is a continuation-in-part of our copending application Ser. No. 221,883, filed Sept. 6, 1962, now abandoned. More particularly, the invention embraces novel compositions of matter produced by the reaction of a reactive monomeric compound and a hydrocarbon material with an oxygen-supplying reactant, and lubricants of improved viscosity index containing such novel compositions.

It is known to produce viscosity index improving agents by reacting hydrocarbons with sulfur or oxygen to produce condensation products of relatively high molecular weight. One such material may be produced by contacting a hydrocarbon starting material having a molecular weight in excess of about 500 while at a temperature of at least 400° F. with at least about 5% by weight of elemental sulfur for a time period requisite to produce a condensation product effective as a viscosity index improving agent. Such sulfur and oxygen condensed hydrocarbon viscosity index improving agents are satisfactory in many applications but in some environments may not be wholly comparable with commercially available materials useful for the same purpose. A proportion of the viscosity index improving ability of these sulfur and oxygen condensed hydrocarbons viscosity index improving agents is lost when modified with $P_2S_5$ to better their oxidative stability. Alone they are subject to oxidative degeneration. Moreover, the production of such sulfur condensed hydrocarbon compositions is economically objectionable in some respects as requiring an excessive amount of sulfur.

It is, accordingly, one primary object of the present invention to provide viscosity index improving compositions derived from hydrocarbons, reactive monomers, and oxygen which are comparable in function to commercially available viscosity index improving agents such as polybutenes and polymethacrylates.

Another object of this invention is to provide viscosity index improving compositions which have greater oxidative stability than sulfur and oxygen condensed hydrocarbon and are resistant to reduction of viscosity index upon addition of $P_2S_5$.

More specifically, it is an object of the invention to provide novel viscosity index improving agents by co-oxygen condensing a hydrocarbon and a reactive monomer.

The art has for some time recognized the utility of sulfurized fatty acid esters as lubricant additives for various purposes. Such sulfurized fatty acid additives are produced by the direct reaction between the ester and sulfur or a sulfur-supplying reagent in the absence of a hydrocarbon reactant. It is an additional primary object of the present invention to provide a novel composition of matter which may be produced in a single step which is an effective viscosity index improver for lubricants and which is non-corrosive to a copper strip, by a novel method of co-oxygen condensing a hydrocarbon and a reactive monomer.

It is a more specific object of the invention to provide a novel viscosity index improving composition by the co-oxygen condensation of an unsaturated ester of a fatty acid and a raffinate fraction of a crude oil.

It is yet another specific object of the invention to provide lubricant compositions of improved viscosity index comprising the contemplated novel oxygen co-condensates.

It is an additional object of the invention to provide a method for co-oxygen condensing a hydrocarbon and an unsaturated fatty acid ester to produce a co-condensate useful as a viscosity index improving agent.

It is a more specific object of the invention to provide a method for producing oxygen condensed hydrocarbon materials effective as viscosity index improving agents in which the amount of oxygen required to provide the desired product is substantially reduced or minimized as compared with that requisite to produce a comparable product from oxygen and a hydrocarbon only.

There are provided by the present invention, novel compositions of matter produced by co-oxygen condensing a hydrocarbon starting material having an ebullioscopic molecular weight in excess of about 750 and a reactive monomeric compound, preferably selected from the group consisting of unsaturated fats and oils and unsaturated fatty acid esters with oxygen at a temperature in excess of 350° F. for a time period requisite to produce a final co-condensation product having a viscosity of at least 300 SUS at 210° F., effective in a concentration of about 10% by weight to increase the viscosity index of a 60 at 100 SUS standard base oil derived from a paraffinic crude source of at least about ten viscosity index units more than a like amount of the hydrocarbon starting material from which said co-condensation product is produced.

In this application the term "viscosity index improving agents" shall be used to include a viscosity index improvement beyond that normally attainable by oxygen or sulfur condensing hydrocarbons in which no ester is employed as well as a viscosity index improvement equal to that attainable by oxygen condensing hydrocarbons in which no ester is employed but with a significantly lesser amount of oxygen and with marked improvement in oxidation stability over the simple hydrocarbon oxygen condensates.

There are further provided by this invention novel viscosity index improving compositions of matter produced by co-oxygen condensing a hydrocarbon starting material having an ebullioscopic molecular weight in excess of about 750 and an ester of an unsaturated fatty acid with oxygen at a temperature in excess of about 350° F. for a time period requisite to produce a final co-condensed product having a viscosity of at least about 300 SUS at 210° F., effective in a concentration of about 10% by weight to increase the viscosity index of a 60 at 100 SUS standard base oil derived from a paraffinic crude source at least about ten viscosity index units more than a like amount of the hydrocarbon starting material from which said condensation product is produced and at least five viscosity index units greater than an equal amount of condensation product derived by oxygen condensing the hydrocarbon starting material alone.

The compositions of matter with which this invention is concerned are usually further characterized by a ring and ball softening point, measured by ASTM Method E 28–42T, of at least about 80° F. Certain compositions comprehended by this invention are characterized by a ring and ball softening point or a viscosity which is too low to permit effective measurement in accordance with the aforementioned procedure. All compositions embraced by the invention, however, are characterized by a viscosity of at least about 300 SUS at 210° F.

The hydrocarbon starting materials which are employed in the production of the viscosity index improving agents of this invention have an average ebullioscopic molecular weight of at least about 750. An optimum ebullioscopic molecular weight range is from about 1200 to about 1700.

The most appropriate starting materials for the production of the viscosity index improving agents contemplated by the invention take the form of suitable fractions of crude oils. Appropriate fractions derived from crude oils of any source, including Pennsylvania crude oils, Mid-Continent crude oils, West Coast crude oils, Canadian crude oils, and the like, can be employed. All types of crude oils, including paraffin base crude oils, asphalt base crude oils, and naphthenic crude oils provide suitable sources from which petroleum fractions useful in the production of the viscosity index improving agents of the invention can be derived.

With respect particularly to fractions derived from Pennsylvania crude oils, it is preferred that the hydrocarbon starting materials from which the viscosity index improving agents of this invention are produced be characteristized by a bromine number not in excess of 10.

It is additionally preferred that hydrocarbons which are utilized as starting materials for the production of the viscosity index improving agents of the invention contain more than about 2 naphthenic rings per molecule, which rings can be individually integrated with the paraffinic chain portion of the hydrocarbon molecules or condensed with aromatic rings and/or with other naphthenic ring systems. It is also preferred that the hydrocarbon starting materials contain an average of not more than about 50% aromatic carbon atoms. Hydrocarbons which contain an appreciable quantity of highly condensed ring systems, such as those hydrocarbons which are found in the phenol or furfural extracts of lubricating oils, are operable and are most appropriately employed as starting materials for the production of viscosity index improving agents for synthetic lubricating oil compositions such as the diester oils.

Additionally, it is preferred that the petroleum fractions from which the viscosity index improving agents of the invention are produced contain not more than about 10% of the wax-type materials. The wax content herein referred to its determinable by a procedure similar to that described under ASTM designation D–721–51T with the exception that methyl isobutyl ketone is employed to precipitate the wax, the sample size is reduced to 0.5 gram, and the determination is conducted at 0° F. While the starting materials which contain substantially more than 10% by weight of wax, as determined by this test, e.g., petrolatum which may reflect a wax content on the order of 40% by weight, can be employed in the production of the viscosity index improving agents of the invention, such materials are not preferred. Such materials can be best used by blending with more desirable starting materials, such as the preferred petroleum fractions above described, in proportions up to about 25% by weight of the total blend.

Normal or vacuum distillation residual stocks and analogous fractions of paraffin base crude oils, such as Pennsylvania crude oils, are highly appropriate starting materials for the production of the viscosity index improving agents employed in this invention. Hydrocarbons precipitated by conventional propane precipitation processes from each residual stocks are particularly suitable.

Further refinement of such propane precipitated, high molecular weight hydrocarbons, which include both light and heavy resin fractions, by extraction with furfural or phenol in conventional manner, yields a raffinate from which viscosity index improving agents of maximum effectiveness are produced. Conventional solvent extraction processes are utilized to obtain such raffinates. Such processes are well known to the prior art and are described in detail, inter alia, in Industrial and Engineering Chemistry, 40, pages 220–227 (1948), and at pages 335–336 of "Chemical Refining of Petroleum" by V. A. Kalichevsky and B. A. Stagner, Reinhold Publishing Co., 1942. Generally, the degree of extraction should be such as to yield about a 70% to 85% raffinate. More drastic extraction, for example, to yield 50% to 60% raffinates, may be practiced to obtain still more desirable starting materials for the production of the viscosity index improving agents of the invention.

The most preferred starting material for the production of the viscosity index improving agents of this invention embraces a solvent extracted Pennsylvania crude oil fraction having a molecular weight of from about 1200 to about 1700, a bromine number of not more than about 4, which is substantially wax and asphalt free, which contains not more than about 5% by weight of hydrocarbon molecules containing more than 50% aromatic carbon atoms, and which consists primarily of hydrocarbon molecules containing an average of from about 2 to about 7 naphthenic rings.

The invention generically embraces unsaturated fats and oils and unsaturated fatty acid esters such as diethylene glycol dioleate, lard oil, pentaerythritol dioleate, triethylene glycol dioleate, and others.

In the production of viscosity index improving compounds the invention embraces generically all esters of unsaturated fatty acids. More specifically, the esters contemplated include unsaturated fatty acid esters of monobasic acids, such as dilinolenyl oleate, esters of unsaturated dibasic acids, such as dierycyl maleate and dilinoleryl maleate, glycol fatty acid esters such as diethylene glycol dioleate, triethylene glycol dioleate, triethylene glycol and tall oil fatty acid ester, and polyethylene glycol dioleates, and polyol esters of unsaturated fatty acids including cottonseed oil, corn oil, soybean oil, lard oil, pentaerythritol oleate, trimethylolethane tall oil fatty acid triester, trimethyolpropane tall oil fatty acid triester, pentaerythritol tall oil fatty acid diester, pentaerythritol tall oil fatty acid tetraester, and N-methyl glucamine tall oil fatty acid ester.

Specific acids which may be employed in the production of the unsaturated fatty acid esters which are combined with propane precipitated resins to produce viscosity index improving co-condensates according to this invention include organic acids containing from 3 to about 25 carbon atoms, which are aliphatic, straight and branched chain, substituted and unsubstituted, such as: oleic acid, tall oil fatty acid, and the like. The specific unsaturated fatty acid utilized does not constitute the essence of the invention.

Specific alcohols which may be employed in the production of the unsaturated fatty acid esters within this invention include all alcohols, both saturated and unsaturated, straight and branched chain, substituted and unsubstituted, such as: triethylene glycol, diethylene glycol, polyethylene glycol, linolenyl alcohol, oleyl alcohol, erucyl alcohol, trimethylolethane, trimethylolpropane, pentaerythritol, N-methyl glucamine.

The oxygen reactant employed may comprise any free oxygen-containing gas or such other oxygen-supplying reagent as may be effective. Air is preferred. Substantially pure oxyen can be employed. Gaseous oxygen in combination with diluents inert under the conditions, such as nitrogen, carbon dioxide, and the like, can be employed.

The rate of supply of free oxygen-containing gas to the reaction mixture is not critical to the production of the viscosity index improving agents of the invention. Generally, the free oxygen-containing gas is passed through the condensation reaction mixture at a rate requisite to provide at least about 10 cubic feet of free oxyen per gallon of hydrocarbon starting material per hour. Preferably, the free oxygen-containing gas is supplied to the reaction mixture at a rate of from about 11 to 27 cubic feet per hour per gallon of hydrocarbon starting material. The corresponding air rates are at least about 50 cubic feet of air per hour per gallon of hydrocarbon starting material, the preferred range being from about 55 to about 135 cubic feet per hour per gallon of hydrocarbon starting material. Reactive materials, such as chlorine, hydrogen chloride, phosphrous pentoxide, and the like materials, which serve as activators can appropriately be introduced into the reaction mixture in conjunction with the free oxygen-containing gas. Conventional catalysts known to art, such as the metal naphthenates, including cobalt naphthenate, can be employed, if desired.

The reactive monomer starting material is suitably employed in proportions of from about 1% to about 25% by weight on the weight of the hydrocarbon starting material, a preferred range being from about 4% to about 15% by weight of reactive monomer on the weight of hydrocarbon starting material.

The temperature is maintained in excess of about 350° F., preferably from about 350–550° F.

The co-condensation reaction by which the novel compositions of matter with which this invention is concerned are produced may be effected in any desired manner. By way of illustration, the co-condensation reaction may be effected in essentially a single step by mixing the desired hydrocarbon starting material, ester, and oxygen-supplying reagent in suitable proportions and heating the mixture at a temperature in excess of 350° F., preferably about 425° F. to 525° F., for a time period requisite to produce a co-condensation product having the desired ring and ball softening point or viscosity. Alternatively, the process may be effected in two steps. In such a two-step process, the reactive monomer is first reacted with oxygen at a temperature in excess of about 300° F., preferably at a temperature of 350–400° F., to effect reaction between the oxygen and the monomer. In the initial step, the temperature is preferably maintained at the minimum value requisite to effect reaction between the oxygen and the reactive sites on the monomer to preclude polymerization thereof. In some cases where reactive unsaturated fatty acid esters are employed, a small amount of polymerization inhibitor may be desirably employed. The product of the first step is then blended with the requisite proportion of the hydrocarbon starting material and the resulting mixture heated to a temperature in excess of 350° F., preferably at a temperature of about 425–525° F., in the presence of additional oxygen, to produce the final co-condensation product which is useful as an additive to improve the viscosity index of lubricants, reduce the oxygen requirements for production of a given viscosity index improvement and impart oxidation stability.

The viscosity index improving agents of this invention may be blended with lubricants in conventional proportions of from about 2.0 to about 15.0 parts by weight per part by weight of lubricant. The particular proportion of viscosity improving agent employed does not constitute the essence of the invention.

The invention contemplates the utilization of the viscosity index improving agents in conjunction with all types of lubricants, including lubricants derived from mineral oils, all of the various synthetic oils, such as di-2-ethyl-hexyl sebacate, bis-(2-ethyl-hexyl)-2-ethylhexyl phosphonate, silicone oils, and the like. It will be appreciated that the invention is not restricted with respect to the type of lubricant in conjunction with which the viscosity index improving agents contemplated are employed.

EXAMPLE I

A. Preparation of hydrocarbon starting material

About 75,000 grams of a cylinder stock derived by distillation from paraffin base Pennsylvania crude oil and characterized by a boiling point in excess of about 850° F., a molecular weight of about 750, a viscosity of 210° F. of 225 SUS, an A.P.I. gravity of about 24.8, and a flash point (Cleveland Open Cup) of about 600° F. is mixed with propane heated to a temperature of about 190° F. and then cooled to a temperature of about 65° F. The cylinder stock-propane solution is thereafter transferred into a chilling tank wherein the pressure is reduced to an extent requisite to volatilize sufficient propane to lower the temperature of the solution to about −20° F. to about −50° F. Makeup propane is added during the chilling operation, such that the ratio of propane to cylinder stock is about 3 to 1 at the end of the chilling cycle. During the chilling cycle, petrolatum is precipitated from the solution. The chilled cylinder stock-propane solution containing precipitated petrolatum is transferred to a filter feed tank and thence passed through an appropriate filter to effect removal of the petroleum from the chilled solution.

Propane is added to the filtrate in an amount sufficient to raise the propane-cylinder stock ratio to about 10 to 1 and the temperature of the solution so obtained is elevated to about 150° F. to 180° F. whereupon about 15,000 grams of high molecular weight viscous materials are precipitated. These viscous materials still contain some propane.

The material so obtained is then mixed at a temperature of about 130° F. to 135° F. with additional propane to increase the propane-oil ratio to about 20 to 1. The temperature of the resulting solution is lowered to about 100° F. whereupon about 6,000 grams of viscous hydrocarbons are precipitated. These materials, after removal of all residual propane, are designated as heavy resins and are characterized by a molecular weight of about 1400, a viscosity of about 4100 SUS at 210° F., and a bromine number of 3.7.

The remaining oil-propane solution is heated to about 150° F. whereupon 8,000 grams of additional viscous hydrocarbons which are designated as light resins are precipitated. Any residual propane is removed in a flash chamber. These hydrocarbons are characterized by a molecular weight of about 1300, a viscosity of about 1150 SUS at 210° F., and a bromine number of about 4.0.

B. Preparation of viscosity index improving agent from diethyleneglycol dioleate About 100 grams of diethyleneglycol dioleate are reacted with oxygen in an amount requisite to provide one equivalent of oxygen per equivalent of olefinic double bond present in said dioleate at a temperature of about 350–450° F. to produce an intermediate oxygen reaction product which is then blended with about 900 grams of light resin raffinate described in A above. The blend so produced is blown with air at a temperature of about 500° F. for a time period sufficient to produce a final co-condensate having a ring and ball softening point of about 257° F.

C. Preparation of viscosity index improving agent from lard oil

The process described in Section B of this example is repeated with the exception that lard oil is employed as a starting material in lieu of diethyleneglycol dioleate and the condensation is terminated when the co-condensate is characterized by a ring and ball softening point of 243° F.

D. Preparation of viscosity index improving agent from pentaerythritol dioleate

The procedure described in Section B of this example is repeated with the exception that pentaerythritol dioleate is employed in lieu of diethyleneglycol dioleate, and the co-condensation reaction is terminated when the co-condensate is characterized by a ring and ball softening point of 258° F.

Lubricants containing the viscosity index improving agents produced as described in Sections B, C and D of this example The viscosity index improving agents produced in the manner described in Sections B, C and D of this example are blended in concentrations 10% by weight with a lubricating oil consisting of a mixture of 25% by weight of a 70 at 100 neutral stock and 75% by weight of a light neutral raffinate and the viscosity-temperature behavior of the resulting blend determined. A control test of like character is conducted with respect to a like amount of light resin raffinate described in IA which was oxygen condensed in known manner. The results of these tests are reflected in Table I. ASTM Slope referred to in Table I and subsequent tables is also a measure of viscosity temperature properties of a fluid and is calculated as described by E. E. Klaus and M. R. Fenske in ASTM Bulletin No. 215 p. 87–94 (1956).

TABLE I.—VISCOSITY-TEMPERATURE BEHAVIOR UNSATURATED FATTY ACID ESTERS
[10% concentration in oil]

| Co-condensing agent | R&B (° F.) | 10% concentration | | |
| --- | --- | --- | --- | --- |
| | | Vis. at 210° F. | V.I. | ASTM slope |
| None | 185 | 46.7 | 137.8 | 0.670 |
| Diethylene glycol dioleate | 187 | 51.7 | 146.1 | 0.624 |
| Lard oil | 173 | 56.9 | 148.7 | 0.589 |
| Pentaerythritol dioleate | 188 | 57.4 | 149.5 | 0.584 |

EXAMPLE II

This example illustrates the preparation of a viscosity index improving agent of the type contemplated by this invention in a single step process. 75 parts by weight of light resin raffinate described in Example IA and 25 parts by weight of lard oil are reacted with air. The mixture is blown with air at a temperature of about 500° F. for a period sufficient to produce a co-condensate having a ring and ball softening point of about 240° F. The product so produced is blended in the proportion of about 10% by weight with a 60 at 100 neutral oil. The blend is characterized by a viscosity at 100° F. of 147 SUS, a viscosity at 210° F. of 49 SUS and a viscosity index of 165. The 60 at 100 neutral oil employed is derived from a Pennsylvania base crude oil by redistillation of a wide boiling primary distillate which has undergone chilling to remove wax.

In a comparative experiment it was determined that lard oil blown alone produced a reaction product having a ring and ball softening point of 72° F. and that such reaction product is incompatible with the 60 at 100 neutral oil employed in the example.

While we have described certain preferred embodiments and practices of this invention it will be understood that the invention may be otherwise embodied within the scope of the following claims.

We claim:

1. A composition of matter produced by co-oxygen condensing a liquid petroleum fraction having an ebullioscopic molecular weight in excess of about 750, less than 50% aromatic carbon atoms and a bromine number less than 10 and about 1% to 25% of a reactive monomer from the group consisting of unsaturated fats and oils and esters of unsaturated fatty acids with oxygen at a temperature in excess of about 350° F. but below the temperature of decomposition for a time period requisite to produce a final co-condensed product having a viscosity of at least about 300 SUS at 210° F. effective in a concentration of about 10% by weight to increase the viscosity index of a 60 at 100 SUS standard base oil derived from a paraffinic crude source at least about ten viscosity index units greater than a like amount of the hydrocarbon starting material from which said condensation product is produced, and at least five viscosity index units greater than an equal amount of condensation product derived by oxygen condensing the hydrocarbon starting material alone.

2. A composition of matter produced by co-oxygen condensing a liquid petroleum fraction having an ebullioscopic molecular weight in excess of about 750, less than 50% aromatic carbon atoms, and a bromine number less than 10 and about 1% to 25% of an ester of an unsaturated fatty acid with oxygen at a temperature in excess of about 350° F. but below the temperature of decomposition for a time period requisite to produce a final co-condensed product having a viscosity of at least about 300 SUS at 210° F., effective in a concentration of about 10% by weight to increase the viscosity index of a 60 at 100 SUS standard base oil derived from a paraffinic crude source at least about ten viscosity index units greater than a like amount of the hydrocarbon starting material from which said condensation product is produced, and at least five viscosity index units greater than an equal amount of condensation product derived by oxygen condensing the hydrocarbon starting material alone.

3. A composition of matter produced by co-oxygen condensing a liquid petroleum fraction having an ebullioscopic molecular weight in excess of about 750, less than 50% aromatic carbon atoms and a bromine number less than 10 and about 4% to 15% of diethyleneglycol dioleate with oxygen at a temperature in excess of about 350° F. but below the temperature of decomposition for a time period requisite to produce a final co-condensed product having a viscosity of at least about 300 SUS at 210° F., effective in a concentration of about 10% by weight to increase the viscosity index of a 60 at 100 SUS standard base oil derived from a paraffinic crude source at least about ten viscosity index units greater than a like amount of the hydrocarbon starting material from which said condensation product is produced, and at least five viscosity index units greater than an equal amount of condensation product derived by oxygen condensing the hydrocarbon starting material alone.

4. A composition of matter produced by co-oxygen condensing a liquid petroleum fraction having an ebullioscopic molecular weight in excess of about 750, less than 50% aromatic carbon atoms, and a bromine number less than 10 and about 4% to 15% lard oil with oxygen at a temperature in excess of about 350° F. but below the temperature of decomposition for a time period requisite to produce a final co-condensed product having a viscosity of at least about 300 SUS at 210° F., effective in a concentration of about 10% by weight to increase the viscosity index of a 60 at 100 SUS standard base oil derived from a paraffinic crude source at least about 10 viscosity index units greater than a like amount of the hydrocarbon starting material from which said condensation product is produced, and at least five viscosity index units greater than an equal amount of condensation product derived by oxygen condensing the hydrocarbon starting material alone.

5. A composition of matter produced by co-oxygen condensing a liquid petroleum fraction having an ebullioscopic molecular weight in excess of about 750, less than 50% aromatic carbon atoms, and a bromine number less than 10, and about 4% to 15% of pentaerythritol dioleate with oxygen at a temperature in excess of about 350° F. but below the temperature of decomposition for a time period requisite to produce a final co-condensed product having a viscosity of at least about 300 SUS at 210° F., effective in a concentration of about 10% by weight to increase the viscosity index of a 60 at 100 SUS standard base oil derived from a paraffinic crude source at least about ten viscosity index units greater than a like amount of the hydrocarbon starting material from which said condensation product is produced, and at least five viscosity index units greater than an equal amount of condensation product derived by oxygen condensing the hydrocarbon starting material alone.

References Cited

UNITED STATES PATENTS

| | | | |
|---|---|---|---|
| 2,045,922 | 6/1936 | Pevere | 252—55 |
| 3,095,375 | 6/1963 | Pitman | 252—55 |

DANIEL E. WYMAN, Primary Examiner

I. VAUGHN, Assistant Examiner

U.S. Cl. X.R.

252—56

UNITED STATES PATENT OFFICE
CERTIFICATE OF CORRECTION

Patent No. 3,455,833      July 15, 1969

Franklin I. L. Lawrence et al.

It is certified that error appears in the above identified patent and that said Letters Patent are hereby corrected as shown below:

Column 3, line 60, "its" should read -- is --. Column 6, line 29, "petroleum" should read -- petrolatum --.

Signed and sealed this 21st day of April 1970.

(SEAL)
Attest:

Edward M. Fletcher, Jr.
Attesting Officer

WILLIAM E. SCHUYLER, JR.
Commissioner of Patents